United States Patent
Cambridge (10) Patent No.: US 10,507,614 B2
(45) Date of Patent: Dec. 17, 2019

(54) METHOD FOR CREATING PERSONAL REPLICA DEVICE

(71) Applicant: THIKA HOLDINGS LLC, St. Pete Beach, FL (US)

(72) Inventor: Vivien Johan Cambridge, Myrtle Beach, SC (US)

(73) Assignee: THIKA HOLDINGS LLC, St. Pete Beach, FL (US)

( * ) Notice: Subject to any disclaimer, the term of this patent is extended or adjusted under 35 U.S.C. 154(b) by 191 days.

(21) Appl. No.: 15/656,317

(22) Filed: Jul. 21, 2017

(65) Prior Publication Data

US 2018/0022018 A1 Jan. 25, 2018

Related U.S. Application Data

(60) Provisional application No. 62/365,624, filed on Jul. 22, 2016.

(51) Int. Cl.
*G05B 19/4099* (2006.01)
*G06F 17/50* (2006.01)
*G06T 15/00* (2011.01)
*G06T 17/00* (2006.01)
*G06T 17/20* (2006.01)
*G06T 19/00* (2011.01)

(Continued)

(52) U.S. Cl.
CPC ........... *B29C 64/106* (2017.08); *A61H 19/32* (2013.01); *A61H 19/44* (2013.01); *B29C 33/3835* (2013.01); *B29C 33/3842* (2013.01); *B29C 33/3857* (2013.01); *B29C 64/112* (2017.08); *B29C 64/118* (2017.08); *B29C 64/124* (2017.08); *B29C 64/147* (2017.08); *B29C 64/153* (2017.08); *B29C 64/386* (2017.08); *B33Y 10/00* (2014.12); *B33Y 50/00* (2014.12); *G06T 7/507* (2017.01); *A61H 2201/169* (2013.01); *B29K 2083/005* (2013.01); *G06T 2200/08* (2013.01); *G06T 2207/10012* (2013.01)

(58) Field of Classification Search
CPC ............ B29C 33/3835; B29C 33/3842; B29C 33/3857; B29C 64/10; B29C 64/106; B29C 64/112; B29C 64/118; B29C 64/124; B29C 64/129; B29C 64/135; B29C 64/147; B29C 64/153; G05B 19/4099; G06F 17/50; G06T 15/00; G06T 17/00; G06T 17/20; G06T 19/00; G06T 2207/10012
USPC ............... 264/113, 222, 225, 308, 401, 497; 345/419, 420; 382/154; 700/98
See application file for complete search history.

(56) References Cited

U.S. PATENT DOCUMENTS 5,782,818 A 7/1998 Shubin
5,807,360 A 9/1998 Shubin
(Continued)

OTHER PUBLICATIONS

Grunewald, S. "Ladies, You Can Now 3D Print a Sex Toy Based on Your Lady Parts Thanks to SexShop3D-NSFW." Feb. 2016. [retrieved on Nov. 9, 2017]. URL: https://3dprint.com/118292/3d-print-sex-toy-lady-parts/ entire document.

(Continued)

*Primary Examiner* — Leo B Tentoni
(74) *Attorney, Agent, or Firm* — Volpe and Koenig, P.C.

(57) ABSTRACT

A method and device of providing a replica masturbation device is disclosed. Users upload images of their body parts to a central database, and other users use data sets generated based on these images from the central database to produce replica masturbation devices of the user's body parts.

15 Claims, 10 Drawing Sheets

(51) Int. Cl.
B29C 64/106 (2017.01)
B29C 64/112 (2017.01)
B29C 64/124 (2017.01)
B29C 33/38 (2006.01)
B29C 64/118 (2017.01)
B29C 64/147 (2017.01)
B29C 64/153 (2017.01)
A61H 19/00 (2006.01)
B33Y 10/00 (2015.01)
B33Y 50/00 (2015.01)
G06T 7/507 (2017.01)
B29C 64/386 (2017.01)
B29K 83/00 (2006.01)

(56) References Cited

U.S. PATENT DOCUMENTS

| | | |
|---|---|---|
| 7,300,619 B2 | 11/2007 | Napadensky et al. |
| 2011/0234581 A1 | 9/2011 | Eikelis et al. |
| 2013/0245366 A1 | 9/2013 | Rhodes et al. |
| 2013/0253457 A1 | 9/2013 | Shubin, Sr. |
| 2015/0170416 A1 | 6/2015 | McGregor et al. |
| 2016/0015596 A1 | 1/2016 | Murison |
| 2017/0007496 A1 | 1/2017 | Cambridge |
| 2017/0189263 A1 | 7/2017 | Cambridge |

OTHER PUBLICATIONS

International Search Report and Written Opinion for PCT Application No. PCT/US17/043256, dated Sep. 27, 2017.

METHOD FOR CREATING PERSONAL REPLICA DEVICE

INCORPORATION BY REFERENCE

The following document is incorporated by reference as if fully set forth: U.S. Provisional Patent Application 62/365,624 filed Jul. 22, 2016.

FIELD OF THE INVENTION

The present invention is related to masturbation devices, and more specifically related to a replica masturbation device.

BACKGROUND

Known masturbation devices include an elastomeric gel that resembles human flesh and is molded to resemble various human orifices. One type of masturbation device includes a handheld object that is made out of a soft silicone rubber which is configured to resemble the tactile properties of human flesh. These known masturbation devices include an orifice that serves as a vaginal orifice that is configured to receive a user's penis during masturbation.

Known masturbation devices are often shaped to physically resemble a vagina. Some known masturbation devices are shaped to resemble a particular adult film star's genitals. The known processes for creating these personalized masturbation devices is cumbersome and involves molding the vagina of the subject and casting rubber material in the mold. The process of creating the mold is expensive, time consuming, and cumbersome as it usually requires the production of metal tooling suitable for rapid high volume production of the final molded product.

It would be desirable to provide a relatively inexpensive, simple, and highly customizable way to provide a masturbation device including a replica of a user's genitals.

SUMMARY

In one embodiment, a masturbation device including a completely customizable molded body part and/or orifice is provided. In one embodiment, a method and a device to create a new type of masturbation device which is a personalized replica of the body part, such as a vagina, of a specific person, including both external and internal features of the body part, such as a vagina, is provided.

In another embodiment, a system for cloning, replicating, recreating and/or customizing a body part for use as a masturbating device, such as a vulva and vagina of a specific woman, that is personalized to a specific woman, is provided. The system can, for example, create a replica of the woman's genitals based at least in part on standard photography. The embodiment can include 3D-printing components so that the system is less expensive and less time consuming than other known processes available in the prior art.

In another embodiment, a method and device for quickly and inexpensively replicating the shape of a body part, such as the vaginal canal of a woman, and incorporating that shape as part of a masturbator device, is provided. The method includes a first process which includes components for acquisition of visible light imagery of the subject's external genitalia that is to be modeled. A processor is provided for converting said imagery to three dimensional (3D) data, and a printer system is provided for 3D printing an inverted cast of the modeled external genitalia based on said 3D data. A casting component is provided for casting liquid silicone rubber into said cast to create the replica of the subject's external genitalia.

In another embodiment, a process is provided for replicating the internal body part, such as a vaginal canal of the subject person's genitalia. This process includes filling a flexible container bag with a rapid setting mixture and inserting the bag into a vaginal canal of a user. The rapid setting mixture hardens to conform to the shape of the vaginal canal, after which the flexible container bag is removed from the vaginal canal.

In another embodiment, visible light imagery of the hardened container bag is acquired, and a processor is used to convert the imagery to 3D data. A printer is then used to print an inverted cast representative of the 3D data.

BRIEF DESCRIPTION OF THE DRAWINGS

A more detailed understanding may be had from the following description, given by way of example in conjunction with the accompanying drawings wherein.

DETAILED DESCRIPTION

The term three dimensional printer, 3D printer, or variants thereof used herein can include any type of 3D printing technologies. For example, the 3D printer can include a printer that uses laminated object manufacturing, binder jetting, additive manufacturing, rapid prototyping, layered manufacturing, stereolithography, fused deposition modeling, or any other type of known 3D printing method. These techniques are well known to an artisan in the relevant arts. For example, multiple techniques that may be used with respect to the present invention are disclosed in U.S. Pat. No. 7,300,619, the entirety of which is incorporated by reference as if fully set forth herein. 3D printing is also known as digital additive manufacturing or additive manufacturing. Software for 3D printing allows users to design products with improved functional structures.

In one embodiment, a method of providing molded replica devices to a plurality of users is provided. The method includes acquiring a plurality of images of a plurality of models' body parts, which is described in more detail herein. The acquisition step can be directly performed by a model.

Alternatively, the images can be obtained through external resources, i.e. through the internet, website images, etc. The method includes converting the plurality of images of the models' body parts to a 3D data set. This process is described in more detail herein. In one embodiment, the images are essentially mapped to a 3D rendering. The method includes storing the 3D data set on a central database. The central database can include any type of known database, which essentially stores data sets. Access to the database can be controlled through any known type of security or permission protocol. The method includes providing access to the central database via a connection to a plurality of users. Access to the central database can be monitored according to a variety of known access protocols. For example, access can be controlled based on users paying a single fee for access to the database. Alternatively, users can be requires to pay a subscription fee for access to the central database for an agreed period of time. The central database can include a search engine, menu, and/or any other type of searching and indexing configuration. Users can search the central database using filters, keywords, or any other type of searching function. The plurality of users can download a selected/specific 3D data set representative of a specific one of the plurality of models' body parts. The 3D data set can be in any type of known file formats, such as STL, VRML, AMF, GCode, OBJ, X3G, PLY, FBX, or any other type of 3D data format. The method includes creating a molded replica device including a 3D replica of the specific one of the models' body parts based on the specific 3D data set.

Figure 1:
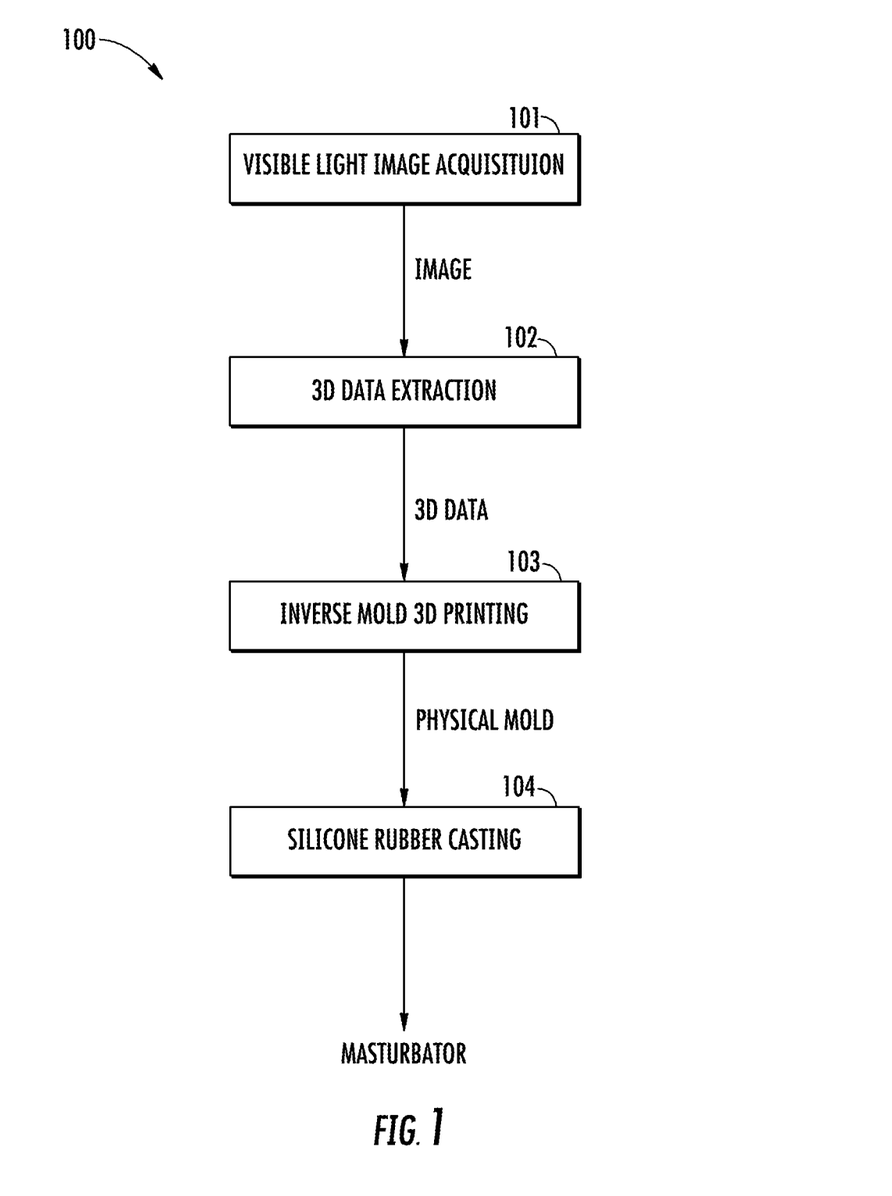
FIG. 1 illustrates a first embodiment of producing a replica masturbation device.

As shown in FIG. 1, a process 100 according to one embodiment is illustrated. The process 100 generally takes a photographic image, creates a 3D model from the photographic image, creates an inverse mold from the 3D model, and then provides a molded component cast from the mold that replicates the original photographic image.

The process 100 begins with the acquiring a visible light image 101 of a normal, orthogonally projected image of a subject's body parts, such as the genitals. One of ordinary skill in the art would recognize that other images besides images of genitals can be used in this process. Once acquired, the image is processed and extracted 102 to produce a 3D dataset suitable for 3D printing. This process is described in more detail below with respect to FIGS. 4 and 5. The process 100 then creates 103 an inverted mold shaped to match data related to the genitals of the subject. Finally, the process 100 includes pouring liquid silicone rubber into the inverted mold 104, and allowing the liquid silicone rubber to set and harden into a masturbation device that replicates the genitals of the subject, i.e. a replica masturbation device. The term replica masturbation device as used herein includes a masturbation device configured to receive a user's sexual organ that is configured to resemble the physical characteristics of another user's genitals. The term molded replica device is also used herein to generically refer to a device that replicates a body part of a user.

Although the material poured into the mold is preferably liquid silicone rubber, one of ordinary skill in the art would recognize from the present disclosure that alternative materials can be used. In one embodiment, the mold formation step is omitted, and the process creates a masturbation device directly from the 3D data acquired in step 102.

U.S. Pat. Nos. 5,782,818, 5,807,360, U.S. Pub. 2017/0007496, and U.S. patent application Ser. No. 15/220,836, the entire contents of all of which are incorporated by reference as if fully set forth herein, disclose suitable arrangements for a masturbation device, as well as suitable materials.

Figure 2:
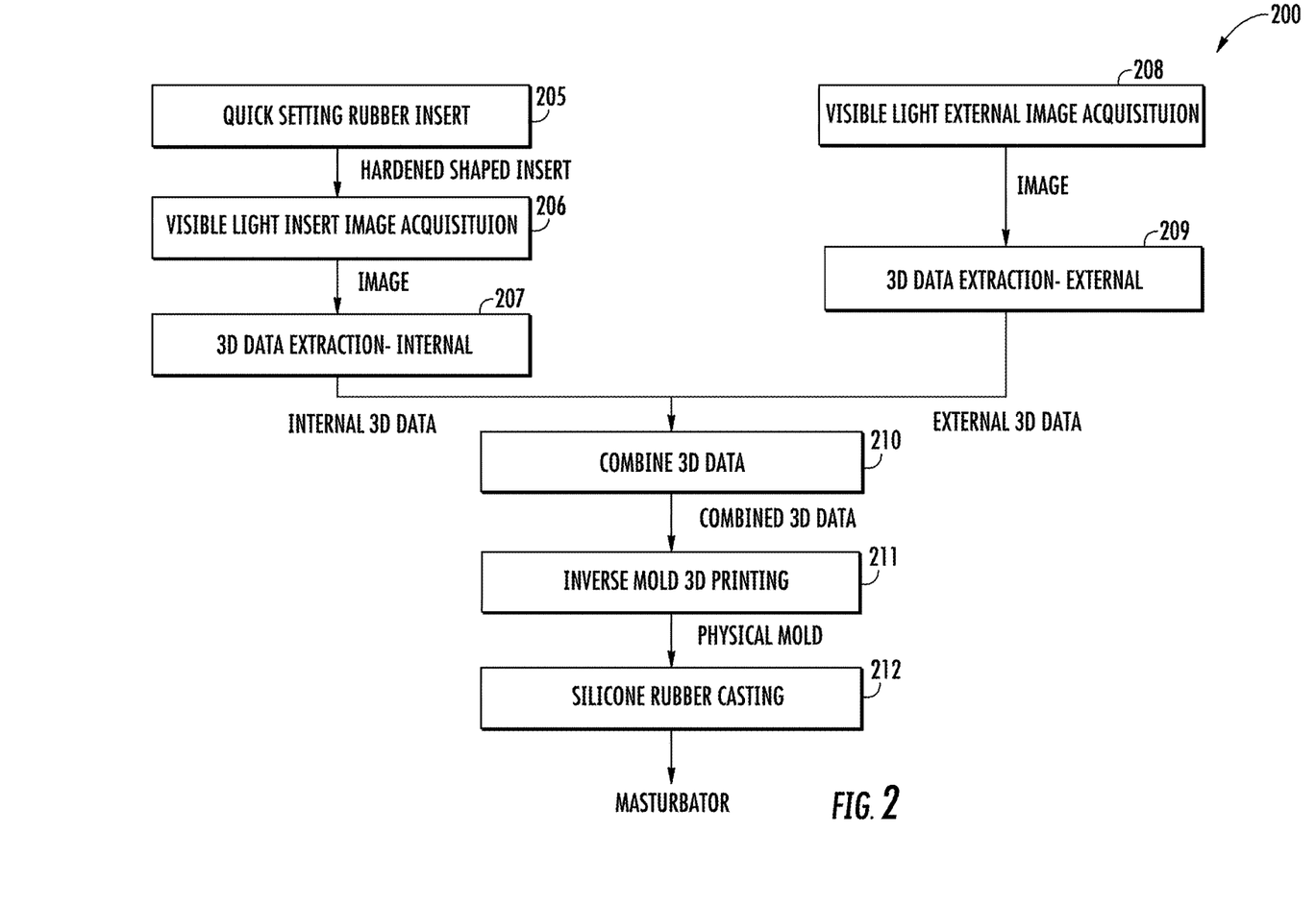
FIG. 2 illustrates a second embodiment of producing a replica masturbation device.

FIG. 2 illustrates another embodiment of a process 200 for providing a masturbation device that replicates both the internal and external features of a user's genitals. According to this process 200, a flexible bag is filled with quick setting material 205. In one embodiment, the flexible bag is formed from latex. In one embodiment, the quick setting material is a quick setting rubber. One of ordinary skill in the art would recognize from the present disclosure that alternative materials could be used for the bag and quick setting material. The flexible bag is then inserted into a user's vaginal canal. After the quick setting material conforms to the user's vaginal canal and becomes relatively harder, the bag is removed from the vaginal canal. Once removed, the flexible bag, which now has a shape replicating the internal features of a user's vaginal canal, is photographed from several directions 206. In one embodiment, the user takes seven different images of the flexible bag: front, back, right side, left side, top, bottom, and perspective. The process 200 utilizes photogrammetry to determine a first 3D dataset representing a physical shape of the vaginal canal based on the hardened material filling the flexible bag. The process 200 also acquires a normal, orthogonally projected image or images of external features of a user's genitals 208. Once acquired, the image or images of the external features of the user's genitals is processed to produce a second 3D dataset for printing 209. The system then combines 210 the first and second 3D datasets into a single combined 3D dataset that is representative of both the internal and external features of a user's genitals. The process 200 then creates 211 an inverted 3D molded shape from the first and second 3D datasets. The process 200 includes pouring 212 liquid silicone rubber into the inverted 3D molded shape, and the liquid silicone rubber hardens into a masturbation device that replicates the user's genitals.

Figure 3A:
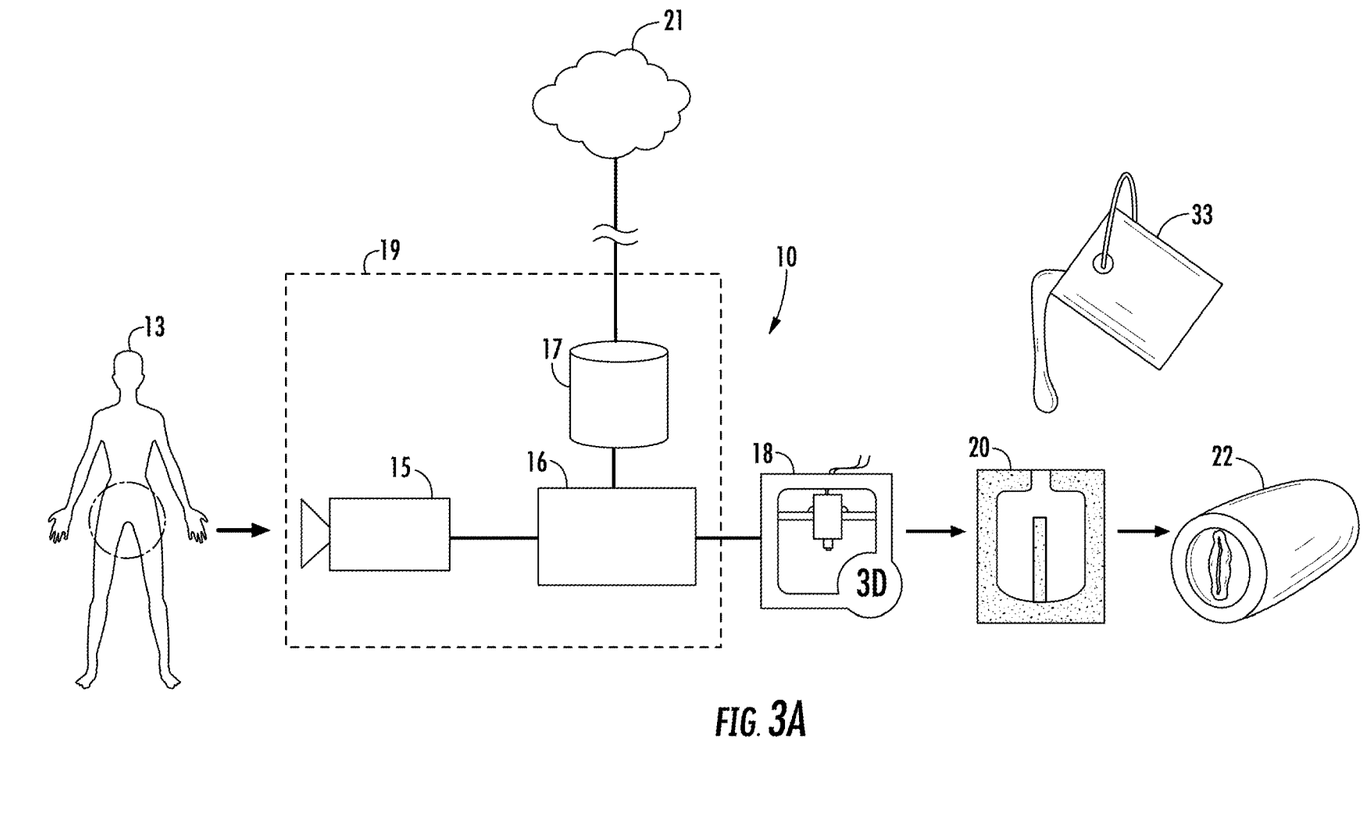
FIG. 3A illustrates a first embodiment of a system for producing a replica masturbation device.

FIG. 3A illustrates one embodiment of the current device 10. As shown in FIG. 3A, the device includes a camera 15 that captures an image of an external genital region of a user's genitals 13. The image captured by the camera 15 is processed by a processor 16 and can be stored on a data storage unit 17. The image provides a 3D data set which is used by a 3D printer 18 to create a molding cast 20 representative of the user's genitals. The molding cast 20 is filled with liquid silicone 33 which hardens into a replica masturbation device 22. One of ordinary skill in the art would recognize from the present disclosure that the system can omit the molding cast 20 and the 3D printer 18 can directly print or produce the masturbation device 22 based on data received from the camera 15 and the processor 16.

In one embodiment, the camera 15, the processor 16, and the data storage unit 17 can all be provided in an electronic device 19 (shown in broken lines), such as a smartphone or computer. As shown in FIG. 3A, the processor 16 or the electronic device 19 can be connected to a network 21, such as the internet or a direct connection to another user. The network 21 provides an interface for the user to either download images or data, or upload images or data.

Figure 3B:
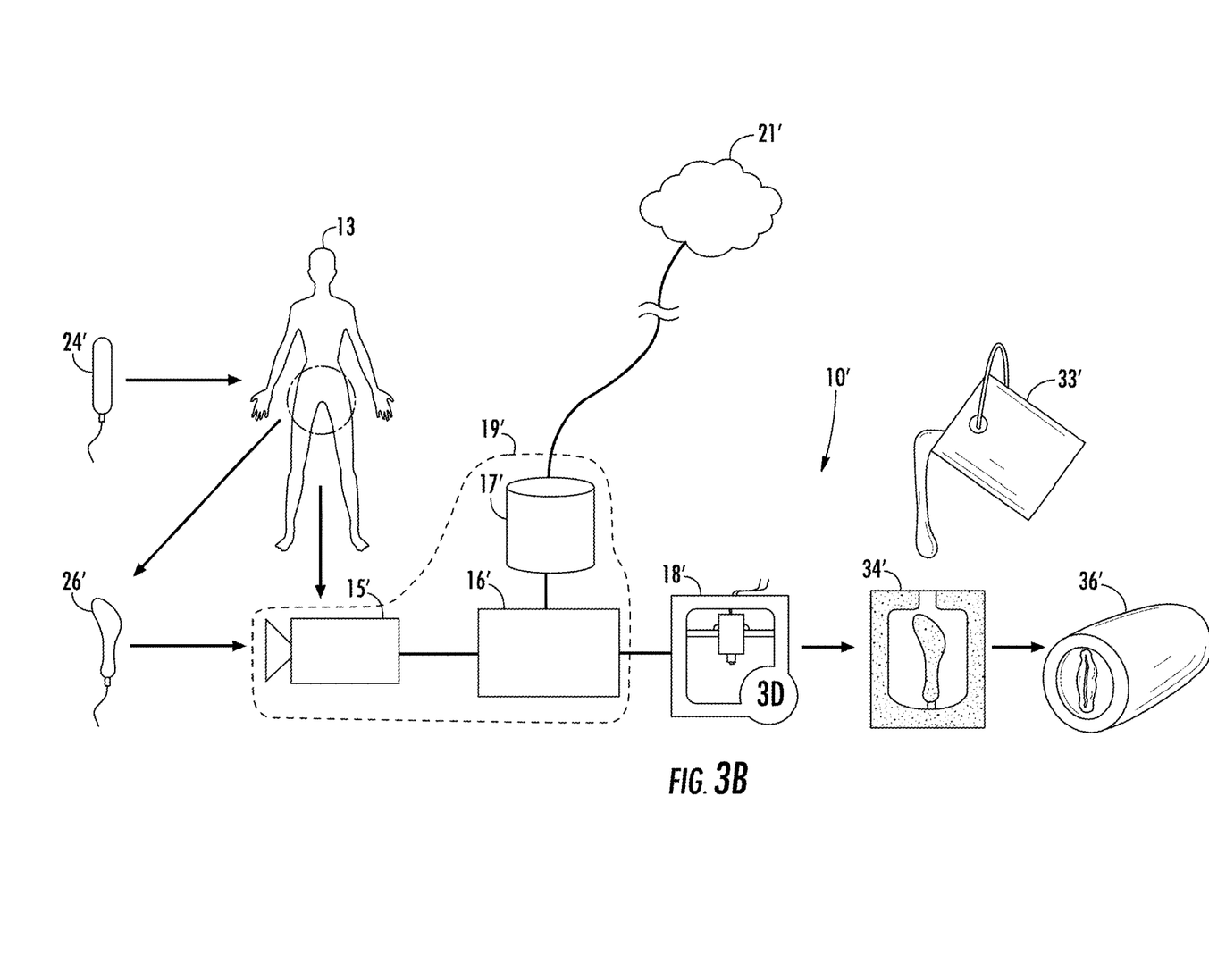
FIG. 3B illustrates a second embodiment of a system for producing a replica masturbation device.

Another embodiment 10' of the present device is illustrated in FIG. 3B. As shown in FIG. 3B, an alternative replica masturbation device 36' is disclosed that replicates both the internal features and external features of a user's genitals. In this embodiment, a bag 24' is filled with a rapid setting material and inserted into a vaginal canal of a user 13' before the rapid setting material sets. The bag 24' is preferably formed from latex. The rapid setting material is preferably a silicone rubber substance.

After the rapid setting material sets, the bag 24' has changed shape to conform to the user's vaginal canal, as shown as bag 26', which now conforms to the user's vaginal canal and is removed from the user. A camera 15' acquires images of the deformed bag 26'. The camera 15' also acquires images of the external features of the user's genitals. Both sets of images are then transferred to a processor 16'. The processor 16' is in communication with a data storage unit 17', and generates a 3D dataset which is used by a 3D printer 18' to create a molding cast 34' that is representative of both an external structure of the genitalia of the user 13' and a shape of the vaginal canal of the user 13'. The molding cast 34 is filled with liquid silicone 33' which hardens into a masturbation device 36' that replicates the user's genitals. Other materials besides liquid silicone can be used to form the masturbation device 36'. Although the embodiment described above is related to replicating a user's genitals, one of ordinary skill in the art would recognize from the present disclosure that other body parts of a user could be replicated using the same 3D printing system.

Figure 4:
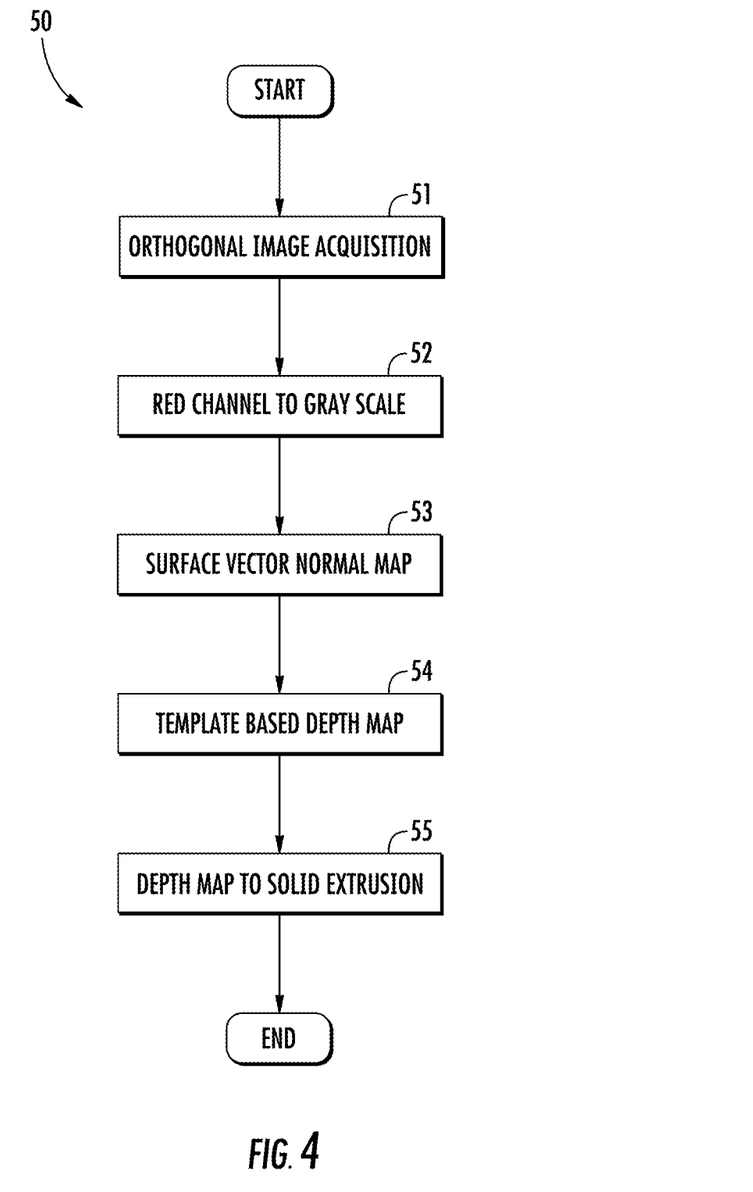
FIG. 4 illustrates an embodiment of a process converting an orthogonal image to a 3D data set.
Figure 5:
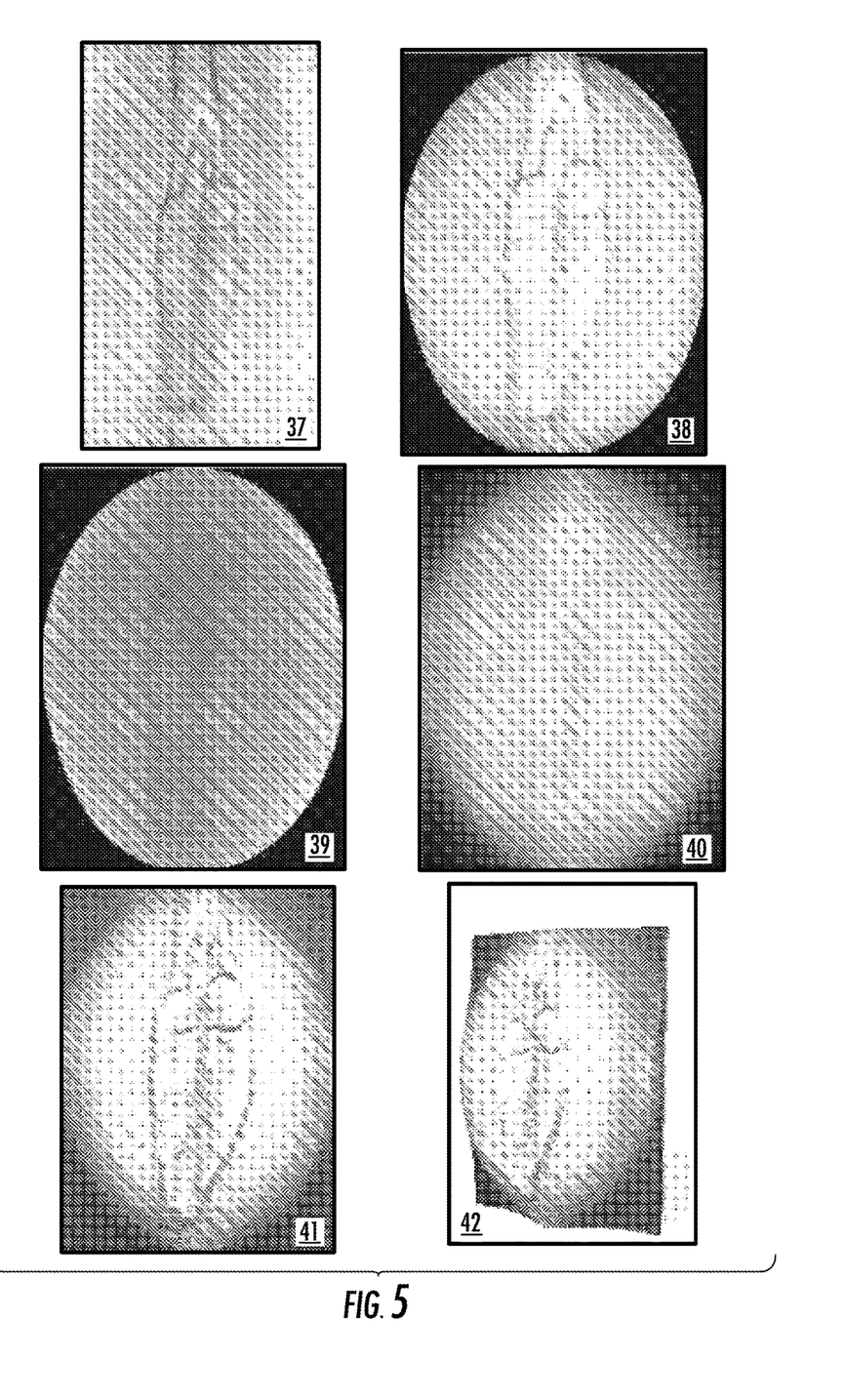
FIG. 5 illustrates shows exemplary embodiments of images according to different stages in the process of FIG. 4.

FIG. 4 illustrates a process 50 which illustrates the logic of an algorithm for performing the process of converting image data depicting the external structure of the genitalia of the user to a 3D dataset (shown in various states in FIG. 5) used by a 3D printer to create a molding cast. As shown in FIG. 4, a red channel of an image 37 (shown in FIG. 5) is captured 51 by a camera, and used to create a grey scale image 52. The camera can include any type of known camera, such as the camera built-in existing smartphones. The grey scale image 38 (shown in FIG. 5) is subjected to a surface normal vector perturbation 53 to create a normal map 39 (shown in FIG. 5). The orthogonal component of the normal vector, which is related to a curvature of the surface, is intensity. The surface normal map 39 (shown in FIG. 5) generated in step 53 is enhanced and modified during step 54 using templates that incorporate knowledge of the shape of the genitalia resulting in depth map 40 (shown in FIG. 5). Finally, in step 55, the depth map 40 (shown in FIG. 5) is converted to a 3D data set which data set describes a solid extrusion 41, 42 (shown in FIG. 5). The 3D data set is provided for 3D printing.

Figure 6:
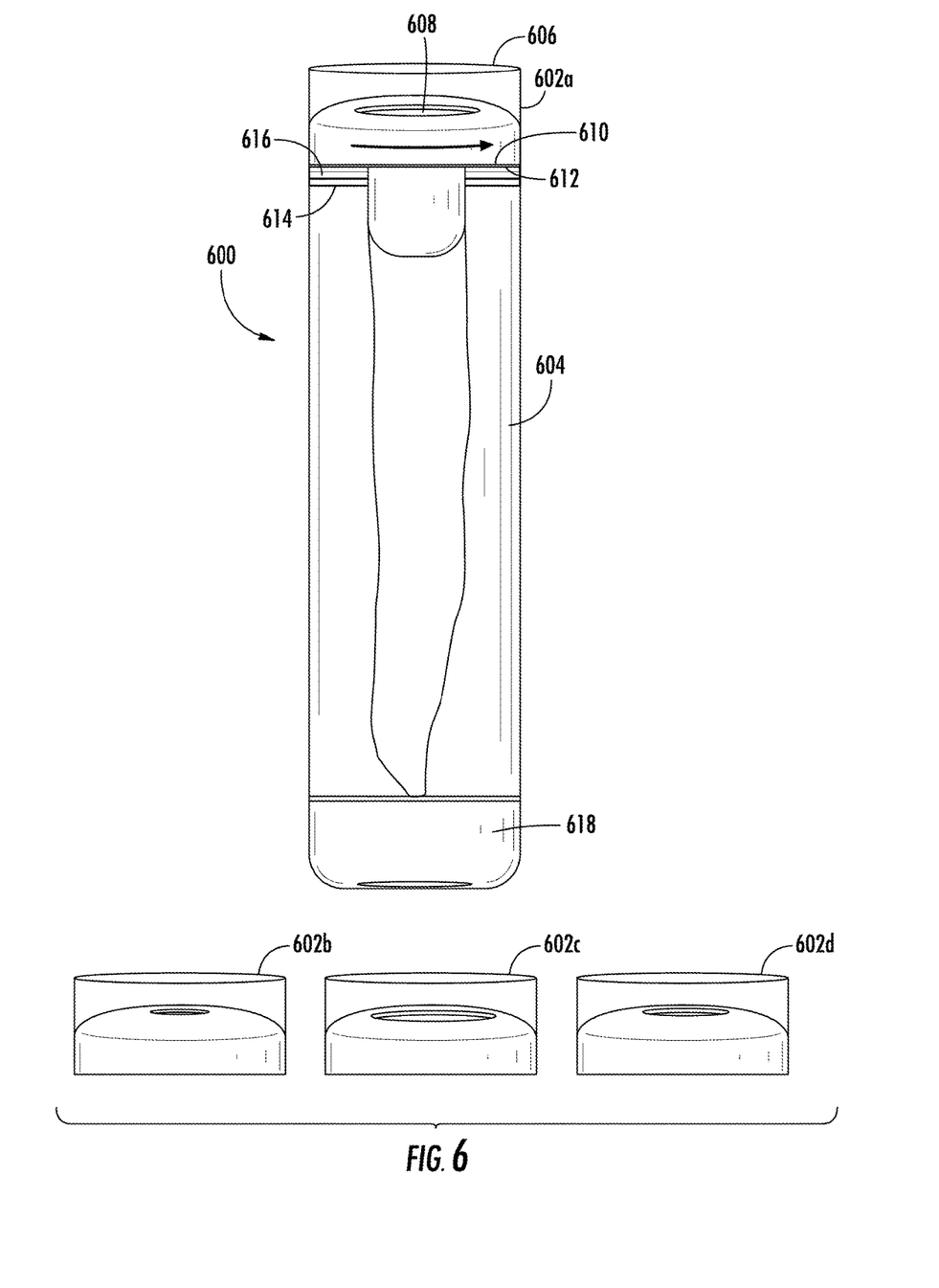
FIG. 6 illustrates an embodiment of a replica masturbation device including a plurality of customized orifice caps.

In one embodiment shown in FIG. 6, a system 600 including a plurality of customized orifice caps 602a, 602b, 602c, 602d for a generic sleeve 604 is provided. The orifice caps 602a, 602b, 602c, 602d are replicas of features of a user's orifice and/or external features of the user's orifice. Each of the orifice caps 602a, 602b, 602c, 602d has a different shape and geometry. The system 600 includes a 3D printer (such as the printer 18, 18' described above) through which a user can input data and print varying configurations of orifice caps 602a, 602b, 602c, 602d for a masturbation device. Each of the orifice caps 602a, 602b, 602c, 602d are formed with a first end 606 including an orifice 608 that extends through the orifice cap, and a second end 610 including a fastener 612 to attach the orifice cap to the sleeve 604. The plurality of customized orifice caps 602a, 602b, 602c, 602d can each be formed according to any one of the processes discussed above. The sleeve 604 includes a first end 614 including a fastener 616 that mates with the fastener 612 defined by the cap 602a. The fasteners 612, 616 can include a threading or any other known type of fastener. In one embodiment, the sleeve 604 includes a lubrication supply assembly 618. In one embodiment, the 3D printer is configured to modify the first end of the orifice cap to mold the first end into a customized orifice design. The designs for the plurality of orifice caps 602a, 602b, 602c, 602d can be provided from a variety of sources. In one embodiment, a user can provide an image (such as image shown in element 37 in FIG. 5) to the 3D printer system, and the 3D printer system can then mold the orifice cap into a corresponding design based on the image. In one embodiment, a user can download a design file and provide the file to the 3D printer system, and the 3D printer system can then mold the orifice cap into a corresponding design based on the file. The user can download the design file from a network, directly from another user, or any other source.

Figure 7:
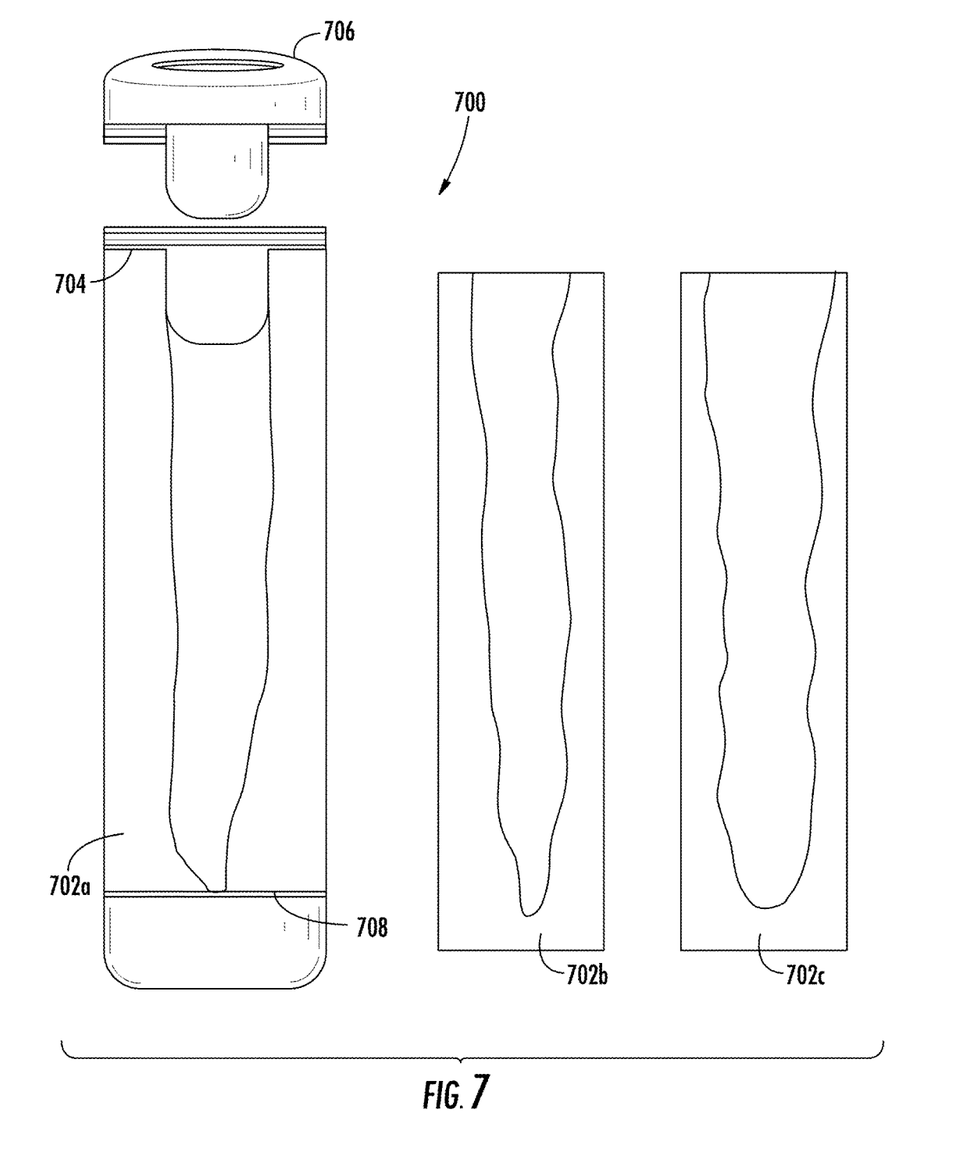
FIG. 7 illustrates an embodiment of a replica masturbation device including a plurality of customized sleeves.

In another embodiment shown in FIG. 7, a system 700 including a plurality of customized sleeves 702a, 702b, 702c is provided. The sleeves 702a, 702b, 702c are replicas of the internal features of a user's genitals. A 3D printer system (such as the printer 18, 18' described above) is configured to produce varying configurations of the sleeves. Each of the plurality of sleeves 702a, 702b, 702c includes a first end 704 with a mating feature that is configured to matingly engage with a corresponding mating feature of an orifice cap 706. A second end 708 of the sleeve 702 can include an interface for connecting to a lubrication supply assembly 710. As described above with respect to FIG. 6, a user can download a variety of designs for the sleeves 702a, 702b, 702c. The user can download a design file for the sleeves from a network, from another user, or any other source. The 3D printer system can then print any one of the sleeves.

One of ordinary skill in the art would recognize that variations can be made to the systems 600, 700, such as combining the two systems 600, 700 so a customizable sleeve and orifice cap and be provided in a single system. One of ordinary skill in the art would also recognize from the present disclosure that one or more features or components of the process 50, the process 100, the process 200, the device 10, and the device 10' can be incorporated into the systems 600, 700.

Figure 8:
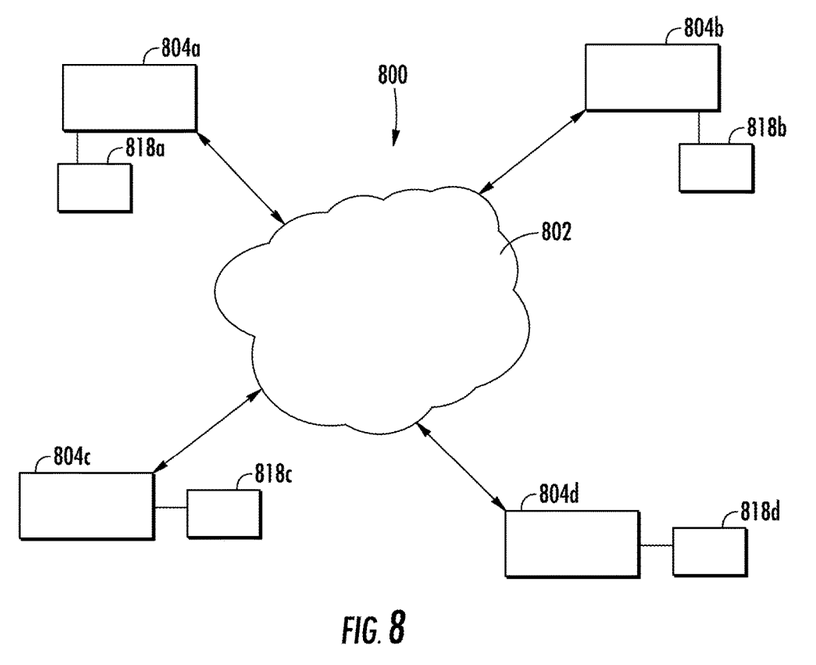
FIG. 8 illustrates a system including a central database for providing access to a plurality of customized features for replica masturbation devices.

In one embodiment shown in FIG. 8, a system 800 includes a central database 802 that stores a plurality of design files corresponding to a plurality of orifice designs. As used herein, the term orifice designs include the external features of genitals and/or the internal features of the genitals. The database 802 stores, indexes, and catalogues the plurality of design files corresponding to the plurality of orifice designs. Users can access the database 802, for example via the internet, and download a selected design file from the plurality of design files to a local computer 804a, 804b, 804c, 804d. The local computers can include a processor, camera, data storage unit, etc., such as disclosed in the electronic devices 19, 19' in FIGS. 3A and 3B. Users can also upload either an image of the user's genitals or a design file representative of the user's genitals to the central database 802. The central database 802 can convert an image of the user's genitals into a design file. This process can be performed according to the process and logic illustrated and described with respect to FIGS. 4 and 5 above. Once downloaded, the user can then instruct the 3D printer system 818a, 818b, 818c, 818d to produce an orifice cap including the orifice design from the selected design file. The orifice cap can then be attached to a generic sleeve. In one embodiment, the system 800 can require payments or a subscription for users to have access to the orifice designs stored in the central database 802.

In one embodiment a shell is provided that houses one of the sleeves. The shell can include a transparent top cap. One embodiment of the system provides a modular configuration, such that a customer can purchase various caps or sleeves, which are all adaptable to engage with a common shell.

In another aspect of the invention, one person can use a system of the invention for ordering a mold of a body part of another user of the system. In this aspect, an online ordering system or menu is provided, where a first user can login and select a profile of a second user. The first user can send a request to order a body part to be formed from the images of a second user. The second user, by using aspects of the present invention previously described, can then take an image of a requested body part, and using the present invention, either create a molded replica using the 3D printing techniques as described, or send an image file to the first user so the first user can create a 3D printed device using either a third party service, or their own 3D printer.

Figure 9:
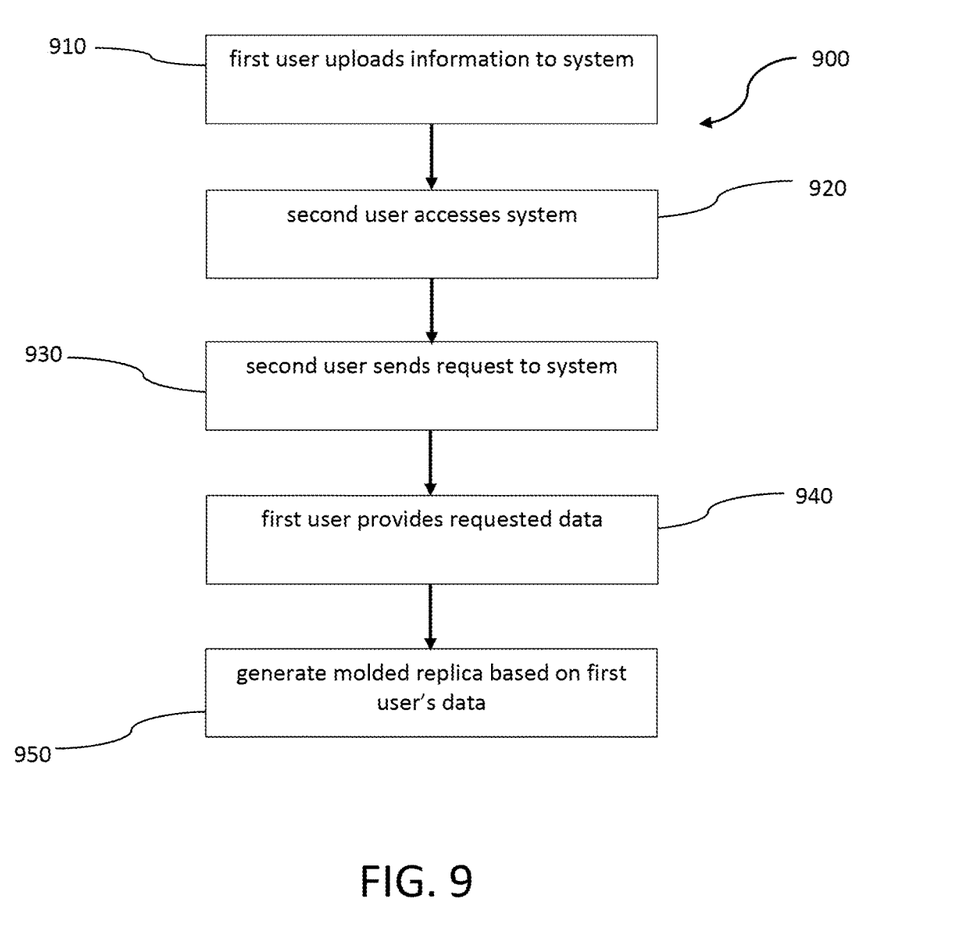
FIG. 9 illustrates a flow chart of a method according to one embodiment of the invention.

According to one embodiment shown in FIG. 9, a method 900 of providing information regarding a first user's body parts to a second user is provided. The second user then ultimately can generate a replica device of the first user's body parts. The method 900 includes: step 910 including the first user uploading personal information to a system or database. The personal information can include features of the first user, photographs of the first user's body parts or any other type of information related to the first user. The second user accesses the system 920 and can browse a plurality of profiles uploaded by other users. The profiles can include a variety of information regarding the users, for example physical attributes of the users, photographs of the users' body parts, height, weight, age, etc. The second user then sends 930 a request to the system to order a data file representing the selected user (i.e. the first user). During this step, the second user may also be prompted to pay a fee for the request to the system. Alternatively, the second user can have a subscription to access the system. One of ordinary skill in the art would recognize from the present disclosure that alternative forms of payment or membership to the system can be used. During step 940, the first user provides data regarding a specifically requested body part to the system or directly to the second user. Step 940 can be optional, and the first user can provide the data during step 910. Next, a molded replica of the first user's body parts is generated 950. In one embodiment, the first user can generate the molded replica using the 3D printing techniques as described herein. Alternatively, the first user can send data (such as a computer file in the appropriate format for 3D printing) regarding the first user's body parts to the second user via the system, and the second user can generate a molded replica using the 3D printing techniques as described herein. One of ordinary skill in the art recognizes that any one or more of the steps of the method 900 can be omitted.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A method of providing molded replica devices to a plurality of users, the method comprising:
 (a) acquiring a plurality of images of a plurality of models' body parts;
 (b) converting the plurality of images of the models' body parts to a three-dimensional data set;
 (c) storing the three-dimensional data set on a central database;
 (d) providing access to the central database via a connection to a plurality of users, wherein the plurality of users can download a specific three-dimensional data set representative of a specific one of the plurality of models' body parts; and
 (e) creating a molded replica device including a three-dimensional replica of the specific one of the models' body parts based on the specific three-dimensional data set.

2. The method of claim 1, further comprising compensating the plurality of models for providing the images of the plurality of models' body parts in step (a).

3. The method of claim 1, wherein access to the central database in step (d) requires the plurality of users to provide payment or a subscription to the central database.

4. The method of claim 1, wherein the connection in step (d) is provided via an internet connection.

5. The method of claim 1, wherein step (e) is performed by a three-dimensional printer system.

6. The method of claim 1, wherein step (e) is performed by a three-dimensional printer system producing a mold, pouring a liquid material into the mold, and curing or hardening the liquid material to form the molded replica device.

7. The method of claim 1, where the central database stores information associated with the plurality of models, and the plurality of users can browse the information associated with the plurality of models.

8. The method of claim 1, wherein the molded replica device is formed from silicone.

9. The method of claim 1, wherein the molded replica device includes an orifice end and a sleeve, and the orifice end includes features representative of external features of the model's body parts, and the sleeve includes features representative of internal features of the model's body parts.

10. The method of claim 1, wherein the central database is indexed and organized such that the plurality of users can search the central database.

11. The method of claim 1, wherein the plurality of images acquired in step (a) are acquired by photographing the plurality of models' body parts and uploading the images to the central database.

12. A method of providing a molded replica device, the method comprising:
 a first user providing personal image data to a central database;
 converting the personal image data from the first user into a three-dimensional data set;
 a second user accessing the central database and downloading the three-dimensional data set; and creating a molded replica device based on the three-dimensional data set via three-dimensional printing.

13. The method of claim 12, wherein the second user provides payment to a system storing the central database to access the three-dimensional data set.

14. The method of claim 12, wherein a plurality of users store personal image data on the central database, and the central database is accessible to the plurality of users.

15. The method of claim 12, wherein the molded replica device includes features representing the first user's genitals.

* * * * *